Oct. 26, 1965    R. D. BREMER    3,214,568
ELECTRIC HOT PLATE
Filed Dec. 13, 1962    2 Sheets-Sheet 1
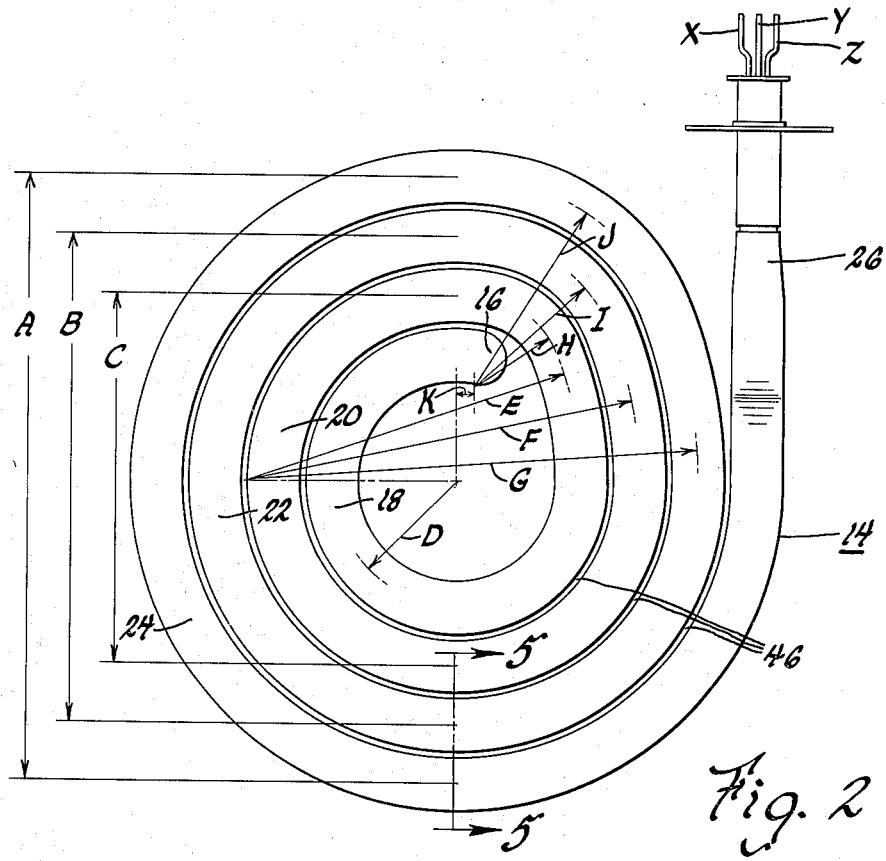
Fig. 2
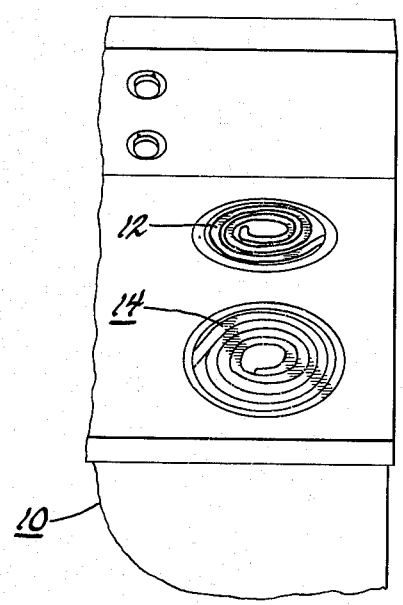
Fig. 1
| Z to Y | | X to Y | |
|---|---|---|---|
| Watts | Volts | Watts | Volts |
| 3000 | 236 | 1100 | 118 |
Fig. 8
INVENTOR.
Robert D. Bremer
BY
Frederick M. Ritchie
HIS ATTORNEY Oct. 26, 1965   R. D. BREMER   3,214,568
ELECTRIC HOT PLATE
Filed Dec. 13, 1962                                        2 Sheets-Sheet 2

INVENTOR.
Robert D. Bremer
BY
Frederick M. Ritchie
HIS ATTORNEY

United States Patent Office 3,214,568
Patented Oct. 26, 1965

3,214,568
ELECTRIC HOT PLATE
Robert D. Bremer, Dayton, Ohio, assignor to General Motors Corporation, Detroit, Mich., a corporation of Delaware
Filed Dec. 13, 1962, Ser. No. 244,384
5 Claims. (Cl. 219—463)

This invention relates to a domestic appliance and more particularly to a surface cooking unit of increased wattage having improved heat distribution and appearance characteristics and increased wattage.

The domestic electric range art has long sought a surface cooking unit having the heat distribution and appearance characteristics of a solid plate heating unit and the rapid heat-up characteristics of a coiled tubular sheathed heating unit.

Accordingly, it is an object of this invention to provide a tubular sheathed cooking unit of closed end design wherein adjacent coil portions of the unit lie in substantially contiguous relationship with each other.

A further object of this invention is the provision of a coiled tubular sheathed cooking unit having closely juxtaposed adjacent coil portions in a common plane and including spacing means for controlling the juxtaposed relationship thereof.

Further objects and advantages of the present invention will be apparent from the following description, reference being had to the accompanying drawings wherein preferred embodiments of the present invention are clearly shown.

In the drawings:

FIGURE 1 is a fragmentary perspective view of an electric range provided with a surface cooking unit of prior art design on the rear thereof and a surface cooking unit on the front thereof which is made in accordance with the teachings of this invention;

FIGURE 2 is a top elevational view of the surface cooking unit of this invention;

FIGURE 8 is a chart indicating the selectable wattage ratings of a combination six inch-eight inch surface cooking unit made in accordance with the teachings of this invention and my copending application Serial No. 49,874 filed August 16, 1960, now Patent No. 3,118,043.

Figure 3:
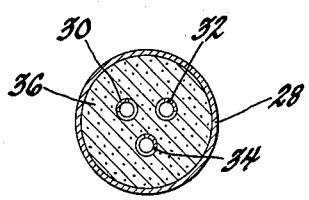
FIGURE 3 is a cross section of the filled and compacted tubular sheath before it is formed into a coiled or convolute unit.

In accordance with this invention and with reference to FIGURE 1, an electric range 10 is provided with a coiled surface cooking unit 12 of prior art design and a surface cooking unit 14 made in accordance with the teachings of this invention. Note that the coils of the surface cooking unit 12 are open in appearance whereas the juxtaposed coils of the improved unit 14 are not. The cooking unit 14 has an improved flat platelike appearance and provides improved heat distribution since the spacing between the coils is considerably less than those of the prior art units. An additional advantage of the improved cooking unit 14 resides in the fact that increased wattages are possible with any given diameter without overloading the unit.

In general, the surface cooking unit 14 is formed with a closed inner end 16 about which is wrapped juxtaposed coils 18, 20, 22 and 24, the latter having a terminal connector portion 26 bent below the plane of the coils 18–24 for connection below the range top with a source of electrical power. Projecting from the end of the terminal connector portion 26 are connector spades X, Y and Z which may be connected selectively to a power source to obtain the wattage outputs shown in the chart of FIGURE 8 when the unit is wired in accordance with the teachings of my aforementioned copending application.

The cooking unit 14 is comprised of an outer tubular sheath 28 of stainless steel having a wall thickness of .028"±.002". Manufacture of the unit starts by taking a straight piece of cylindrical tubing 28 (FIGURE 3) which is positioned vertically to receive the resistance elements 30 and 32 and the return wire 34—these elements being spaced from each other and from the sheath 28 by densely compacted magnesium oxide 36. One end of the sheath 28 is closed to form the free end 16 of the unit while the other end thereof is closed to form the terminal connector end 26. Electrical connectors X, Y and Z respectively extend into the sheath for connection with the elements 30, 32 and 34. X connects to the resistance 30, Z to the resistance 32 and Y to the return wire 34. For a coiled cooking unit having a nominal 8" diameter, the initial length of the straight cylindrical tubing will be 62" long ±1/32".

Figure 4:
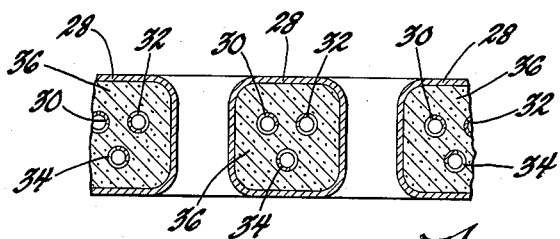
FIGURE 4 is a fragmentary sectional view of a coiled surface cooking unit in an intermediate squared-off form before it is pressed to its final form.

After the resistance coils are compacted within the cylindrical sheath 28, a forming operation sequentially squares off the top, bottom and sides of the sheath as seen in FIGURE 4. A crook is formed on the free end 16 and this crook placed in a coiling drum or fixture. As the drum rotates the squared tube is coiled on itself until all but the terminal connector end 26 is wrapped in a tight convolute manner. The coil is wound in the same plane with the temper of the tube 28 controlling the spring back or limited amount of uncoiling of the squared section sheath to a shape complementary with the grooves in the final forming dies (FIGURE 4). An alternate method of coiling the unit is to wind the squared tube into a conical shape as on a conical mandrel and then to flatten the coils of the upward spiral into a common plane.

Figure 5:
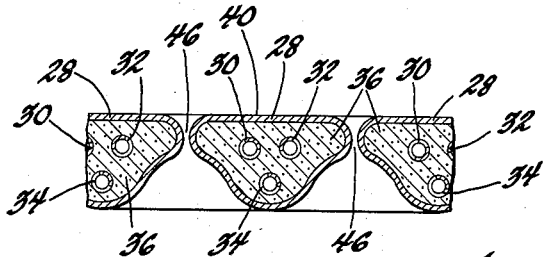
FIGURE 5 is a fragmentary sectional view taken along line 5—5 in FIGURE 2 showing the surface cooking unit in its final form.

After the straight tube for the cooking unit is formed into a coiled shape, it is placed on a flattening die which widens the top of the squared section to provide the cooking surface 40 while compressing the bottom of the unit into a rather triangular shape such as seen in FIGURE 5. Units may be flattened on a 2000-ton hydraulic press using a maximum of 1875 tons. For additional details on the manner of forming the cooking unit of this invention, reference may be had to the patent to Tuttle 2,643,317, issued June 23, 1953.

In accordance with the teachings of this invention and referring again to FIGURE 2, the coils of the cooking unit may be wrapped in closely juxtaposed relationship to each other by providing the unit with the following dimensions—these dimensions pertaining to a nominal 8" diameter unit having four coils, as seen in FIGURE 2. Using the following dimensions with reference to FIGURE 1 and winding the coil from the inner end 16 and terminating at the connector end 26 will result in a convolute cooking unit being formed without overstressing the sheath and without providing irregular spacing between adjacent coils. The nominal centerline diameter A of the outer coil 24 is $6^{27}/_{32}$"; the dimension B is $5^{17}/_{32}$"; C is $4^{7}/_{32}$" diameter; D is $1^{29}/_{64}$" radius; E is $3^{27}/_{32}$" radius; F is $4\frac{1}{2}$" radius; G is $5\frac{5}{32}$" radius; H is $1\frac{1}{32}$" radius; I is $1^{11}/_{16}$" radius; J is $2^{11}/_{32}$" radius; where the dimension K is $1^{3}/_{64}$". With a cooking unit formed in accordance with the foregoing dimensions and energized in accordance with the chart in FIGURE 8, a 3000-watt rating is available when the unit is energized on 236 volts throughout its entire length (8" cooking unit) and an 1100-watt rating is available when the unit is energized on 118 volts throughout a predetermined shorter length comprising the inner convolutions of the unit (6" cooking unit).

It is desirable to maintain a small amount of spacing 46 between adjacent coil portions of the cooking unit in order to provide proper ventilation between the convolutions. This ventilation prevents excessive heat on the underside of the unit and prevents premature burn out of the enclosed resistance coils. For the purposes of this invention such spacing should not exceed $\frac{1}{16}''$.

Figure 6:
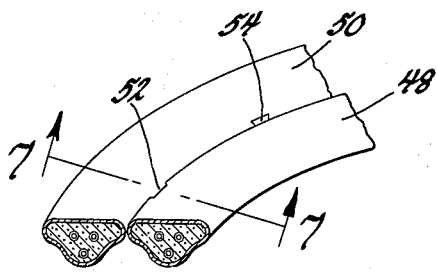
FIGURE 6 is a fragmentary perspective view of a second embodiment of this invention.
Figure 7:
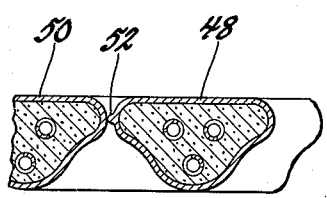
FIGURE 7 is a fragmentary sectional view taken along line 7—7 in FIGURE 6.

An alternate arrangement in accordance with the teachings of this invention provides for controlled spacing of the adjacent coils, such as 48 and 50, in FIGURES 6 and 7. During the forming operation, the flattening die may be designed in a manner to pinch or extrude protuberances 52, 54 alternatingly at spaced points on the convolutions of the formed sheath. When the coils are flattened into their final convolute form, the protuberance 52, for instance, will engage the adjacent coil portion 50, thereby forming a controlled ventilating opening of up to $\frac{1}{16}''$ therebetween.

It should now be seen that an improved tubular sheath electrical cooking unit has been provided having a plate-like appearance and improved heat distribution from its substantially continuous cooking surface. Using the coiled elongated tube teachings of this invention, it is well within the skill of the art to make an independent nominal 6" diameter unit having a 1800-watt rating and a nominal 8" diameter unit having a 3200-watt rating.

While the embodiments of the present invention as herein disclosed constitute preferred forms, it is to be understood that other forms might be adopted.

What is claimed is as follows:

1. A metal sheathed electrical heater comprising a preformed metal tube of stainless steel having a wall thickness of substantially .028 inch and flattened along one side and coiled in a flat convolute winding with the flattened side of the tubing lying in the plane of one side of the convolute winding, said tube having an initial length of substantially 62 inches and a nominal centerline diameter of the outer coil of said convolute winding of substantially 7 inches, the spacing between adjacent portions of said convolute winding being limited to a predetermined value no greater than $\frac{1}{16}$ inch to give the said one side of said heater a substantially continuous surface, resistance means in the tubing extending lengthwise of and in substantially equal proximity to the flattened side of the tubing, said tubing being closed at one end and said resistance means having terminal means projecting therefrom through the other end of the tubing, and powdered insulation in the tubing and confined thereby in a hard dense mass within which the resistance means is embedded.

2. The electrical heater of claim 1 including means integral with said tube for controlling said spacing.

3. The electrical heater of claim 2 wherein said last named means comprises a protuberance on one of said adjacent portions.

4. The electrical heater of claim 3 wherein said protuberance is formed simultaneously with the flattening of said metal tube.

5. A metal sheathed electrical heater comprising a single preformed metal tube of stainless steel having a wall thickness of substantially .028 inch and flattened along one side and coiled in a flat convolute winding with the flattened side of the tubing lying in the plane of one side of the convolute winding, said tube having a predetermined initial length sufficient when coiled into said convolute winding to effect a spacing between adjacent portions of said convolute winding limited to a predetermined value no greater than $\frac{1}{16}$ inch to give the said one side of said heater a substantially continuous surface, resistance means in the tubing extending lengthwise of and in substantially equal proximity to the flattened side of the tubing, said tubing being closed at one end and said resistance means having terminal means projecting therefrom through the other end of the tubing, and powdered insulation in the tubing and confined thereby in a hard dense mass within which the resistance means is embedded.

References Cited by the Examiner

UNITED STATES PATENTS

| 2,413,477 | 12/46 | Wiegand | 219—463 |
| 2,508,552 | 5/50 | Tuttle | 219—463 |
| 2,591,442 | 4/52 | Lacy-Hulbert et al. | 338—242 |

RICHARD M. WOOD, *Primary Examiner*.